(12) United States Patent
Torchio

(10) Patent No.: US 11,965,569 B2
(45) Date of Patent: Apr. 23, 2024

(54) BRAKE WEAR PIN ARCHITECTURE

(71) Applicant: Collins Aerospace Ireland, Limited, Cork (IE)

(72) Inventor: Marcello Torchio, Cork (IE)

(73) Assignee: COLLINS AEROSPACE IRELAND, LIMITED, Cork (IE)

( * ) Notice: Subject to any disclaimer, the term of this patent is extended or adjusted under 35 U.S.C. 154(b) by 240 days.

(21) Appl. No.: 17/680,420

(22) Filed: Feb. 25, 2022

(65) Prior Publication Data
US 2022/0316541 A1 Oct. 6, 2022

(30) Foreign Application Priority Data
Mar. 31, 2021 (EP) .................. 21166381

(51) Int. Cl.
| | |
|---|---|
| F16D 66/02 | (2006.01) |
| B60T 17/22 | (2006.01) |
| B64C 25/34 | (2006.01) |
| B64C 25/44 | (2006.01) |
| F16D 66/00 | (2006.01) |

(52) U.S. Cl.
CPC ............ *F16D 66/027* (2013.01); *B60T 17/22* (2013.01); *B64C 25/34* (2013.01); *B64C 25/44* (2013.01); *F16D 66/02* (2013.01); *F16D 2066/001* (2013.01); *F16D 2066/003* (2013.01); *F16D 2066/006* (2013.01)

(58) Field of Classification Search
CPC .. F16D 66/027; F16D 66/02; F16D 2066/001; B60T 17/22
USPC ...................................... 244/103 R
See application file for complete search history.

(56) References Cited

U.S. PATENT DOCUMENTS

| | | | |
|---|---|---|---|
| 4,520,661 A | 6/1985 | Tamai et al. | |
| 4,658,936 A | 4/1987 | Moseley | |
| 6,450,300 B1* | 9/2002 | Kramer | G01K 13/08 374/E13.01 |
| 7,766,130 B2* | 8/2010 | Walker | F16D 66/02 188/1.11 W |
| 9,441,692 B2* | 9/2016 | Schaefer | F16D 66/025 |
| 9,964,168 B1 | 5/2018 | Pennala et al. | |
| 10,436,271 B2* | 10/2019 | David | F16D 65/095 |
| 10,800,387 B1* | 10/2020 | Georgin | B60T 17/22 |
| 10,941,826 B2* | 3/2021 | Muniraju | G01D 5/40 |
| 10,968,972 B2* | 4/2021 | Prouzet | F16D 55/226 |

(Continued)

FOREIGN PATENT DOCUMENTS

| | | | |
|---|---|---|---|
| DE | 2734786 | 8/1979 | |
| EP | 3530533 A2 * | 8/2019 | B60T 17/22 |

OTHER PUBLICATIONS

EPO, Search Report and Written Opinion dated Aug. 19, 2021 in EP Application 21166381.0-1012.

*Primary Examiner* — Christopher P Ellis
(74) *Attorney, Agent, or Firm* — SNELL & WILMER L.L.P.

(57) ABSTRACT

An architecture that provides automatic monitoring of brake conditions making use of a wear pin on a brake. The disclosure makes use of the fact that a wear pin is required to be provided on an aircraft brake, by integrating monitoring functions such as displacement sensors and/or temperature sensors, into the pin. This means that the automatic monitoring components are not taking up more space on the brake than is already taken up by the compulsory wear pin.

11 Claims, 2 Drawing Sheets

(56) References Cited

U.S. PATENT DOCUMENTS

| | | | |
|---|---|---|---|
| 11,215,436 B2* | 1/2022 | Huang | B60T 17/22 |
| 2019/0219119 A1 | 7/2019 | Schutt et al. | |
| 2019/0263510 A1* | 8/2019 | Bill | B60T 8/1703 |
| 2019/0329755 A1 | 10/2019 | Sheriff et al. | |
| 2020/0080609 A1* | 3/2020 | Muniraju | B60T 17/221 |
| 2020/0149860 A1* | 5/2020 | Huang | F16D 66/02 |
| 2020/0307530 A1 | 10/2020 | Georgin | |
| 2023/0211767 A1* | 7/2023 | Heid | G01M 17/00 |
| | | | 188/1.11 R |
| 2023/0287951 A1* | 9/2023 | Muniraju | F16D 66/02 |

* cited by examiner

BRAKE WEAR PIN ARCHITECTURE

CROSS-REFERENCE TO RELATED APPLICATIONS

This application claims priority to, and the benefit of, EP Application No. 21166381.0, entitled "BRAKE WEAR PIN ARCHITECTURE," filed on Mar. 31, 2021, which is hereby incorporated by reference in its entirety.

FIELD

The present disclosure concerns an architecture to enable electronic monitoring of a brake such as, but not exclusively, an aircraft brake.

BACKGROUND

Vehicle brakes comprise a brake disk or plate, or, more often, a stack of brake disks that is actuated to slow down the vehicle. In particular, during a braking event, stators and rotors (stationary and rotary parts of the brake plate or stack) are pressed against each other. The pressure exercised determines the presence of a friction between the disks, which provides braking action and allows the wheel to stop rotating. It is safety critical that brakes remain functional and reliable. Over their lifetime, brake discs will suffer wear (in the form of eroded material from either the stators or rotors) due to the frictional engagement of the brake disks during braking actions. The final effect translates into a thinning process of the brake plate or stack. This wear needs to be carefully monitored so that the brake disks can be replaced before they become so worn that they no longer perform reliable and effective braking when the brake is actuated. In many applications, e.g. in aircraft, brakes are subjected to extreme environmental and operational conditions.

Conventionally, brake disks have been made of robust metals such as steel to be able to withstand these conditions. More recently, brake disks made of carbon-carbon composites have become popular, as such materials are not only extremely durable and highly temperature resistance, but they are also lightweight compared to steel. This weight reduction is particularly advantageous in aircraft where weight should be minimized.

In all aircraft platforms, the brakes wear is monitored through the use of a wear pin. This is a small pin attached to and extending from the brake disks used to provide a visual indication of the amount of wear of the disk. The wear pin extends a given distance from the brake housing, and it is generally firmly connected to the pressure plate of the brake stack, and is perpendicular to the plate. As the brake disk wears, the overall thickness of the brake stack reduces. As such, the pressure plate gets pushed towards the stack of rotors and stators to keep the overall assembly compact, and the wear pin moves solidly in the same direction. Due to this phenomenon, over time, the portion of wear pin that extends from the brake housing will be smaller and smaller. An engineer performing aircraft maintenance will measure the exposed length of the pin e.g. using callipers to measure the displacement of the brake disk in braking, so as to determine the extent of wear of the brake disk. When the disk is worn to a given degree, it will need to be replaced. The measurement of the exposed pin requires manual measurement by an engineer on the ground and access to the exposed pin length may not always be easy. Such visual identification of wear may be subject to human error.

Although other ways of monitoring wear e.g. electronically, using sensors on the brake disk, for example, aviation authorities still require, for safety certification purposes, that brakes are provided with a wear pin even if other wear sensors are provided. In some cases, the wear pin is functionally redundant but has to be present for regulatory reasons.

Braking of vehicles also generates heat due to the frictional engagement between the stators and rotors of the brake's stack. It is also important to monitor the brake temperature especially in applications where high temperatures can cause safety issues e.g. in aircraft. Conventionally, temperature is measured by means of a thermocouple that is generally installed in a rib of the torque plate. In aircraft, the temperature sensor is used to warn the pilot, in the cockpit, of a so-called 'hot brakes' condition. In the event of such a condition being indicated, the pilot is required to delay take-off until the warning disappears. Such temperature sensors are, however, not particularly accurate since the location of the sensor is not ideal with respect to the heat sink that records the temperature and significant lags and offsets can arise in the sensor readings. Because of these accuracies, the 'hot brake' condition warning is set using very conservative thresholds. This can lead to take-off delays that are not actually necessary. Moreover, more accurate indications of the brake temperature can help in the development of more sophisticated controls and health-monitoring algorithms that can help in improving the operational efficiency of brakes, while enforcing healthrelated constraints.

Based on the afore-mentioned considerations, it is clear that there is a need to provide improved monitoring of brake temperature and enable electronic means to measure and monitor the wear.

SUMMARY

The present disclosure provides an architecture that provides automatic monitoring of brake conditions making use of a wear pin on a brake. The disclosure can therefore make use of the fact that, for example, a wear pin is required to be provided on an aircraft brake, by integrating monitoring functions into the pin. This means that the automatic monitoring components are not taking up more space on the brake than is already taken up by the compulsory wear pin.

According to one aspect, there is provided an architecture for monitoring a brake assembly, comprising a wear pin configured to be mounted to a pressure plate of the brake assembly to provide a visual indication of brake displacement during braking, characterized in that the wear pin is a hollow cylindrical pin and wherein one or more sensors is mounted inside the hollow pin to provide an indication of displacement and/or temperature.

The sensors may comprise a displacement sensor to provide an indication of wear of the brake assembly based on an exposure length of the wear pin and/or a temperature sensor to provide an indication of the temperature of the brake assembly. The displacement sensor may be provided at one end of the pin and the temperature sensor at the other end of the pin. The architecture may further comprise power, transmission and/or control electronics mounted inside the wear pin.

According to another aspect, there is provided a brake assembly comprising a pressure plate arranged to engage a rotating part to be braked, on actuation of the brake assembly, and an architecture as described above attached to and extending from the pressure plate.

According to another aspect, there is provided a landing gear of an aircraft comprising a landing gear arm, an axle extending essentially transverse to the landing gear arm and a wheel at each end of the axle, and further comprising a brake assembly for braking each wheel, the brake assembly comprising a pressure plate arranged to engage a rotating part of the wheel to cause braking of the wheel, and an architecture as described above, and further comprising a target arranged on the landing gear arm to receive signals from the one or more sensors.

Preferred embodiments of the assembly according to the disclosure will now be described by way of example only, with reference to the drawings. The embodiments are described in relation to a brake for an aircraft but it is conceivable that the assembly will find application in other brake systems where it is required to monitor the condition, especially wear and/or temperature of brake components

DETAILED DESCRIPTION

Figure 1:
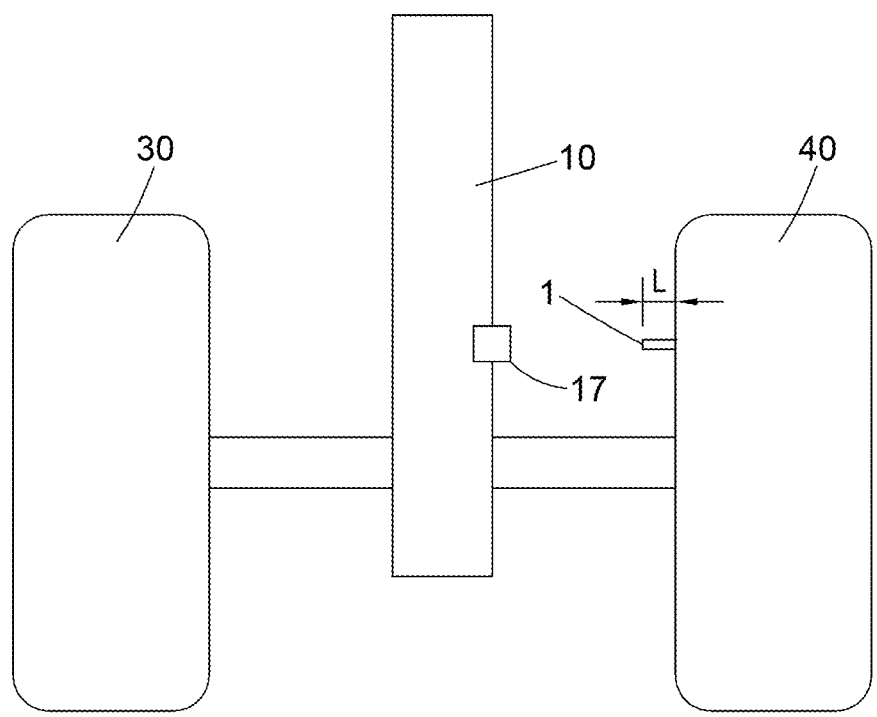
FIG. 1 is a schematic representation of an aircraft landing gear which can incorporate the assembly of the disclosure.

FIG. 1 shows an aircraft landing gear as one environment in which the wear pin of the disclosure can be utilized. FIG. 1 shows, by way of example only, a landing gear arm 10 from which extends an axle 20. A wheel 30, 40 is provided at each end of the axle. As mentioned above, current regulations require all aircraft wheel brakes to be provided with a wear pin to allow visual inspection of wear of the brake disk (not shown). The wear pin 1 is shown in FIG. 1 protruding from the wheel 40. The more the brake disk is worn, the greater its displacement to engage with the inner rotating wheel assembly (not shown) when braking. The wear pin 1 is attached to the brake disk and so the greater the brake disk displacement, the smaller the exposed length L of the pin 1 from the wheel 40. Measurement of the exposed length L allows a manual determination of the degree of wear of the brake disk.

The present disclosure, however, provides an architecture that enables automated monitoring of brake wear and/or brake temperature by forming the wear pin 1 as a hollow pin and mounting monitoring components inside the hollow interior of the pin 1.

Figure 2A:
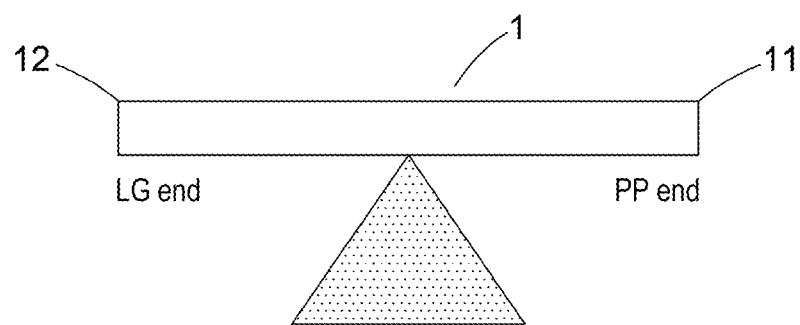
FIG. 2A shows an example of a wear pin according to the disclosure.
Figure 2B:
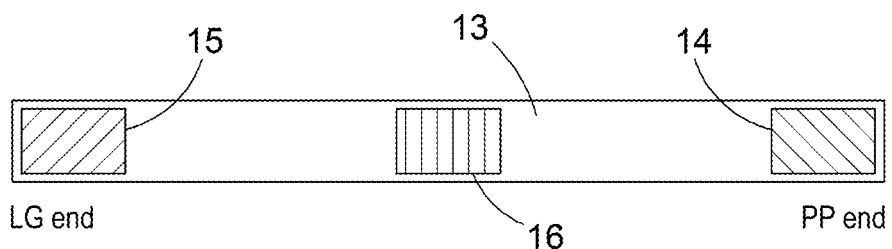
FIG. 2B shows the inside of the pin of FIG. 2A.

This can be better seen in FIGS. 2A and 2B. FIG. 2A shows the pin 1 having a first end 11 arranged to be attached to the pressure plate or brake disk (not shown), and a second, opposite end 12 arranged to extend from the wheel to, in this case, protrude towards the landing gear.

As shown in FIG. 2B, the pin is hollow and monitoring components are mounted in the hollow interior 13. Whilst different monitoring components may be provided in the pin, as will be described further below, in the example shown in FIG. 2B, a temperature sensor and a displacement sensor are provided (here, the temperature sensor 14 is provided at the first end 11 and the displacement sensor 15 at the second end 12. Other components or circuitry 16 for e.g. power supply, conditioning, data transmission etc. may also be mounted inside the pin 1.

If the pin 1 is to be able to automatically measure wear, this function is performed by the displacement sensor 15. This will provide an indication of the distance between the pin and a sensor target 17 at a fixed, known location e.g. mounted on the landing gear opposite the pin end. The displacement sensor is preferably located at an end e.g. the second end of the pin, but the displacement sensor could be mounted at any position inside the pin so long as that position is known and calibrated with respect to the target. The target 17 may be e.g. a metal plate or coating at the target site. The type of target will depend on the type of displacement sensor. Many different types of sensor can be used e.g. an infrared sensor or an ultrasonic sensor or an eddy current sensor. Those skilled in the art will be aware of different sensors that can be used to determine distance between the sensor and a target and the disclosure is not limited to any one type of sensor.

A temperature sensor 14 may be provided in the pin to monitor the brake temperature in a reliable manner to provide a more accurate and faster temperature reading. Location of the temperature sensor 14 in the wear pin 1 means that the temperature sensor can be accurately positioned close to where the temperature increase is most likely to occur. In the example shown, the temperature sensor 14 is located in the pin at the end attached to the brake disk/pressure plate. To increase temperature sensing accuracy, a small hole (not shown) could, for example, be provided in the first end of the pin 1 so that the temperature sensor has direct or almost direct contact with the brake disk whose temperature is being monitored. This may, however, not be necessary, and a temperature sensor mounted inside the pin without any modification to the pin or the pressure plate will also be useful in collecting thermal information about the brake.

The other possible electronics 17 may be to e.g. provide power to the sensors (if required), to provide signal conditioning (if required) and to support date transmission if required.

Power may be provided through wires into the pin or wirelessly. Alternatively, local power may be used e.g. with local power storage.

Data transmission may be performed in any of a number of known ways. Integrated wireless solutions may be used. The pin 1 may have a metal body and this could be used as an antenna. Alternatively, a wired solution could be provided whereby wires are fed out from the pin interior and connected to a receiver (not shown).

Figure 3:
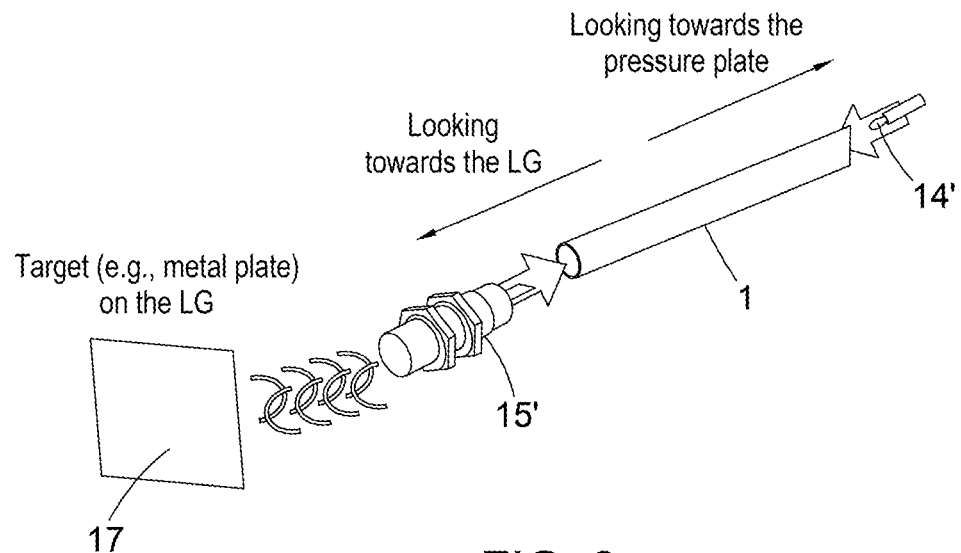
FIG. 3 is a more detailed view of a possible embodiment of the wear pin of the disclosure.

FIG. 3 shows a more detailed example of a wear pin 1 according to the disclosure. FIG. 3 shows the wear pin 1 as shown in FIGS. 1 to 3. A displacement sensor 15', here an eddy current sensor, is inserted into the end of the pin 1 that will protrude from the brake. A temperature sensor, here thermocouple 14' is inserted into the pin at the other end, which will be attached to the brake. A target 17 is provided that will be positioned at a location opposite the displacement sensor end of the pin when the pin is in place, such that the target will detect signals coming from the sensor 15'. The displacement can be sensed e.g. by detecting the time it takes for emitted signals to be reflected back to the sensor by the target. Alternatively, the strength of the signals can be detected as an indication of displacement. Other ways of sensing will be apparent to those skilled in the art.

Figure 4:
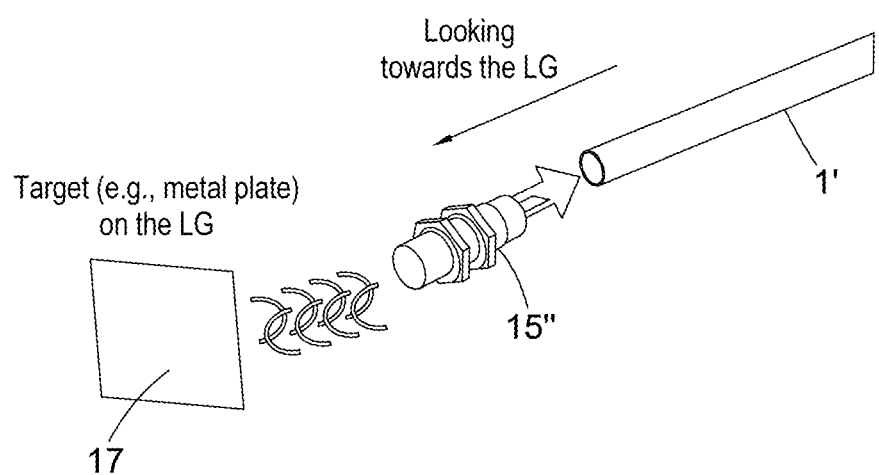
FIG. 4 is a more detailed view of an alternative embodiment of the wear pin of the disclosure.

In the example shown in FIG. 4, the wear pin 1' only has a displacement sensor 15" and does not have a temperature sensor. Alternatively, embodiments can be envisaged (not shown here) that include a temperature sensor but no displacement sensor. The pin can even be furnished with sensors/circuitry as needed for any particular situation and then modified as required by removing/replacing components.

By providing sensors in the pin that are able to automatically provide indication of the state of the brake e.g. wear and/or temperature, the present disclosure allows accurate information to be obtained on any type of platform e.g. different types of aircraft (hydraulic, electrical, hybrid) or other platforms such as other vehicles or machines. The 'intelligent' wear pin of the disclosure can be part of an advanced intelligent control, maintenance. Prognostic, diagnostic system and enables brake wear and/or temperature to be accurately and automatically monitored without the need for down time and human effort.

The invention claimed is:

1. An architecture for monitoring a brake assembly, comprising a wear pin configured to be mounted to a pressure plate of the brake assembly to provide a visual indication of brake displacement during braking, characterized in that the wear pin is a hollow cylindrical pin and wherein one or more sensors is mounted inside the hollow pin to provide an indication of displacement and/or temperature.

2. The architecture as claimed in claim 1, wherein the one or more sensors comprises a displacement sensor to provide an indication of wear of the brake assembly based on an exposure length of the wear pin.

3. The architecture of claim 2, wherein the displacement sensor is mounted proximate a first end of the wear pin.

4. The architecture of claim 2, wherein the displacement sensor comprises an infrared sensor, or an ultrasonic sensor or an eddy current sensor.

5. The architecture as claimed in claim 1, further comprising a target arranged to be located at a given position relative to the wear pin to receive signals from the one or more sensors.

6. The architecture of claim 5, wherein the target comprises a metal plate.

7. The architecture of claim 1, wherein the one or more sensors comprises a temperature sensor to provide an indication of the temperature of the brake assembly.

8. The architecture of claim 7, wherein the temperature sensor is mounted proximate a second end of the wear pin.

9. The architecture of claim 1, further comprising power, transmission and/or control electronics mounted inside the wear pin.

10. A brake assembly comprising a pressure plate arranged to engage a rotating part to be braked, on actuation of the brake assembly, and an architecture as claimed in any preceding claim attached to and extending from the pressure plate.

11. A landing gear of an aircraft comprising a landing gear arm, an axle extending essentially transverse to the landing gear arm and a wheel at each end of the axle, and further comprising a brake assembly for braking each wheel, the brake assembly comprising a pressure plate arranged to engage a rotating part of the wheel to cause braking of the wheel, and an architecture as claimed in claim 1, and further comprising a target arranged on the landing gear arm to receive signals from the one or more sensors.

* * * * *